US008845834B2

(12) United States Patent
Robin et al.

(10) Patent No.: US 8,845,834 B2
(45) Date of Patent: Sep. 30, 2014

(54) METHOD FOR ASSEMBLING AT LEAST TWO PLASTIC COMPONENTS TO EACH OTHER

(75) Inventors: Stéphane Robin, Beauvais (FR); Pascal Juan, Gonesse (FR); Merry Morel, Esches (FR)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 13/367,299

(22) Filed: Feb. 6, 2012

(65) Prior Publication Data
US 2013/0112336 A1    May 9, 2013

(30) Foreign Application Priority Data

Feb. 7, 2011    (FR) ...................................... 11 50954

(51) Int. Cl.
*B32B 37/00* (2006.01)
*B29C 65/08* (2006.01)
*B29C 65/00* (2006.01)
*B06B 3/00* (2006.01)

(52) U.S. Cl.
CPC ............ *B29C 65/08* (2013.01); *B29C 66/73921* (2013.01); *B06B 3/00* (2013.01)
USPC ......................... 156/73.1; 156/293; 156/308.4

(58) Field of Classification Search
USPC ................... 156/73.1, 290, 293, 308.2, 308.4, 156/309.6, 580.1, 580.2; 264/442, 443, 264/444, 445; 425/174.2
See application file for complete search history.

(56) References Cited

U.S. PATENT DOCUMENTS

| 3,499,808 | A | * | 3/1970 | Obeda ............................ 264/249 |
| 4,253,226 | A | * | 3/1981 | Takeda ........................... 29/432.1 |
| 4,859,378 | A | * | 8/1989 | Wolcott ......................... 264/445 |
| 4,865,680 | A | * | 9/1989 | Pierson ....................... 156/580.2 |
| 6,099,291 | A | * | 8/2000 | Lanser ............................ 425/508 |
| 8,048,246 | B2 | * | 11/2011 | Perez Madueno et al. .. 156/73.1 |

FOREIGN PATENT DOCUMENTS

| CA | 2632980 A1 | 1/2009 |
| DE | 10-2007055856 A1 | 6/2009 |
| EP | 2020285 A2 | 2/2009 |
| JP | 60051027 U | 4/1985 |
| JP | 2007046749 A | 2/2007 |

OTHER PUBLICATIONS

French Search Report for FR 1150954, dated Oct. 28, 2011, 2 pages.

* cited by examiner

*Primary Examiner* — James Sells
(74) *Attorney, Agent, or Firm* — Reising Ethington P.C.

(57) ABSTRACT

The method comprises the following steps:
provide a first part (5) with a first protruding relief (29);
provide a second part (7) with a first orifice (31);
insert the first protruding relief (29) through the first orifice (31).

The second part (7) has a second protruding relief (35) located in proximity to the first orifice (31), with the first protruding relief (29) and the second protruding relief (35) melted and, after cooling off, assembling together the first and second parts (5, 7) to each other.

12 Claims, 3 Drawing Sheets

METHOD FOR ASSEMBLING AT LEAST TWO PLASTIC COMPONENTS TO EACH OTHER

The invention generally relates to joining parts of plastic material to one another.

More specifically, the invention relates to a method for assembling to one another at least two parts of an automobile vehicle, with the method comprising the following steps:
provide a first part with a first protruding relief;
provide a second part with a first orifice;
insert the first protruding relief through the first orifice;
create a connection of the first part to the second part by melting the first protruding relief.

WO-A-2010/025687 describes a method of this type, in which the protruding relief is first softened by projection of a hot gas, then mechanically deformed and folded back on a face of the second part opposite to the first part.

When a large space separates the first part from the second part, it is necessary to provide that the first protruding relief has a great height. This has several drawbacks. A relief of great height may be difficult to obtain if the first part is an injected part. This is notably the case when the zone of the mold intended to form the first protruding relief is far from the injection point of the plastic material into the inside of the cavity of the mold.

Therefore, during the cooling off of the first part, a shrink pocket can appear on the face of the part opposed to the first protruding relief. When the first part is a trim part intended to be visible by the passengers of the vehicle, such a shrink pocket creates the impression of low quality.

In this context, the invention aims at proposing a method allowing the assembling of two parts having a large gap between them, so that the application is easier.

For this purpose, the invention relates to an assembly method of the aforementioned type, characterized in that the second part has a second protruding relief located in proximity to the first orifice, with the second protruding relief melted during the step of creation of the welded joint and providing material to the welded joint, so that the first protruding relief and the second protruding relief, after cooling off, assemble together the first and the second parts to each other.

Thus, due to the fact that a portion of the material of the welded joint is provided by the second protruding relief, the height of the first protruding relief may be reduced since the amount of material to be provided is smaller. Therefore, the risk that the injected material does not reach the bottom of the mold intended to form the first protruding relief is reduced. Therefore, the risk of a shrink pocket occurring in the first part is also reduced.

Preferably, the first and the second protruding relief are melted so as to create a weld between respective materials of said first and second protruding reliefs.

Typically, the second relief extends beyond the end of the first relief over a first determined distance. By adding material from the second relief, it is possible to increase the possibilities for designing the length of the first relief. The first relief may then have a smaller length, thus reducing the risks:
of a visual flaw of the face visible by the passenger of the vehicle
of a filling flaw of the first relief.

According to another characteristic of the invention, the first protruding relief protrudes with respect to the second part over a second distance, with the first distance comprised between 0 and two-thirds of the second distance, and preferably between 0 and half of the second distance.

With this distance, a ratio of the material originating from the first and second parts may be established. This ratio guarantees good hold of the mechanical joint between both parts; this ratio also gives the possibility of assembling parts of different (non-homogeneous) materials.

According to another characteristic of the invention, the second distance is between 0.8× an outer diameter of the first protruding relief and 2.5× an outer diameter of the first protruding relief. With this ratio, a good mechanical hold may be guaranteed.

Advantageously, a third part can be placed between the first and second parts, the third part having a second orifice through which the first protruding relief is engaged, with the first welded joint firmly attaching the first, second and third parts to each other.

Thus, it is possible to make the most of the fact that the first and second parts may have a large gap between each other for welding three parts to each other, with the third part located between the first and second parts.

It would be also possible to weld more than three parts by placing two additional parts or three additional parts between the first and second parts. These different parts must each include an orifice, into which the first protruding relief is engaged.

The first and second parts, and optionally the additional parts, may have any kind of shapes and be made in any kinds of material. However, the method is particularly suitable for small parts of plastic material which may be melted. These parts may also be multilayer parts comprising at least one layer of plastic material which may be melted.

Typically, the first part is a part intended to be visible by the passengers of the vehicle. More specifically, it has a first large face intended to be visible, with the first protruding relief formed on a second large face opposite to the first one. Thus, the first protruding relief is formed on a non-visible face of the first part. The zones of the other parts, in which the orifices are made, are concealed by the first part.

Typically, the method is intended to form an internal paneling element of the automobile vehicle, for example, a lining panel. This lining panel can be, for example, a lining panel of an orifice frame or of any other zone of the automobile vehicle.

The first part includes a first, typically planar zone, the first protruding relief being a small tubular column integral with one of the large faces of the planar zone. Here, a small tubular column means a structure with a tubular form, firmly attached to the planar zone through a first end and open at its second end. It may have any kind of section—round, square, etc.

Typically, the second protruding relief is a wall extending over the entire periphery of the first orifice. The wall may extend at a distance from the peripheral edge of the first orifice. It may also define the peripheral edge of the orifice and coincide exactly with it. This wall may be continuous or have discontinuities. It forms a tubular extension of the orifice into which the first protruding relief is engaged.

For example, the first part contains a zone bearing the first protruding relief, with the said first protruding relief protruding over a height between 10 and 35 mm with respect to said zone. The height of the first protruding relief and the height of the second protruding relief with respect to the zone of the second part, in which the orifice is formed, are selected so as to provide sufficient material to the welded joint in order to be able to firmly attach the first part to the second part and optionally the first and second parts with the additional parts, found between said first and second parts. The height of the first protruding relief is also dependent on the gap between the first and second parts. The gauge corresponds here to the distance that separates the first and the second parts from each other, with this distance taken, for example, along the small column making up the first protruding relief.

Preferably, the first and/or the second part and/or the additional parts located between the first and second parts include reliefs forming the spacers allowing a predetermined spacing to be maintained between the different parts to be welded. With this ratio, it is possible to guarantee a good mechanical hold.

The welded joint is made typically by means of ultrasonic welding. However, other types of welding might be used.

Other characteristics and advantages of the invention will become apparent from the detailed description which is provided below as an example and as an indication and with no limitation whatsoever, with reference to the appended figures, among which:

Figure 1:
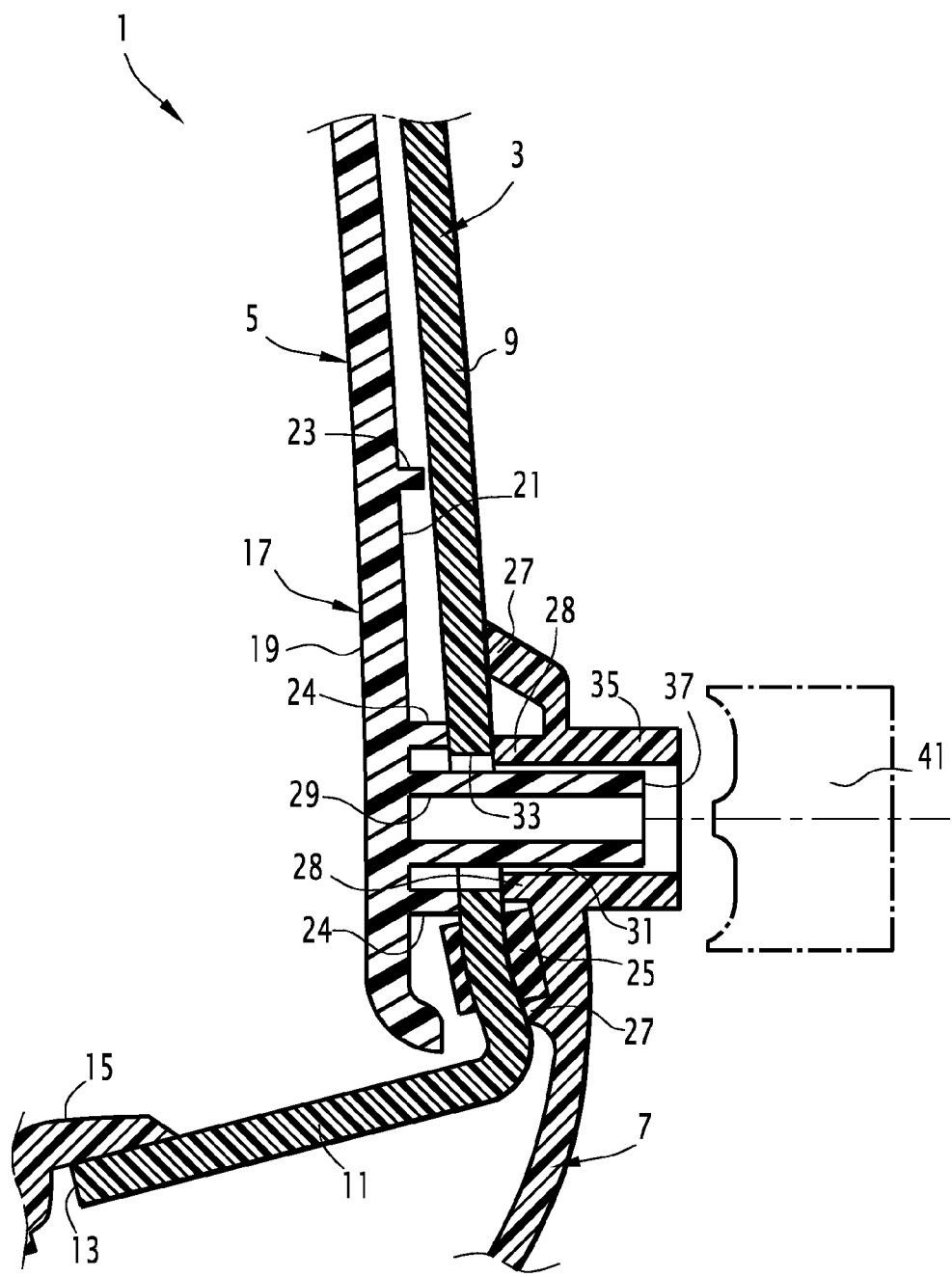
FIG. 1 shows a sectional view of a zone of a door panel of an automobile vehicle containing three parts assembled to each other by a method according to the invention, with FIG. 1 showing the three parts prior to producing the welded joint.

The panel 1 is a lining panel to be placed over an orifice frame of an automobile vehicle, on the inner side of it. It is intended to be attached, for example, to a metal sheet of the orifice frame.

This panel contains a bearing part 3, a decorative medallion 5 intended to be attached onto the bearing part 3, and a seal casing 7 intended to be also attached on the bearing part 3.

The bearing part 3 is a small part made from thermofusible plastic material. As this may be seen in FIG. 1, it has a bent shape with a part 9 intended to be with a substantially vertical orientation and a part 11 intended to be with a substantially horizontal orientation, or slightly inclined with respect to the horizontal.

The part 11 has an orifice 13 intended to receive a control unit, for example, a button 15 for controlling an electric power window of the automobile vehicle.

The medallion 5 contains a zone 17, which is substantially planar, positioned in parallel and facing the portion 9 of the supporting part. The zone 17 has a large face 19 turned towards the inside of the cabin and a large face 21 turned towards the supporting part 3. The large face 19 is intended to be visible by the passengers of the vehicle. It may be optionally covered with a decorative material: carpet, textured cladding or any other suitable decorative material. The large face 21 bears ribs 23, 24 forming spacers intended to maintain a predetermined gap between the medallion 5 and the supporting part 3. These ribs 23, 24 bear against the portion 9 of the supporting part.

The medallion 5 is a part in thermofusible plastic material. It is obtained by injection of plastic material in a mold with a suitable shape.

The case 7 is intended to form a sealed barrier around mechanisms placed under the portion 11 of the supporting part 3. These mechanisms are, for example, the mechanisms for controlling the electric power windows of the vehicle. The medallion 7 is a part injected into a thermofusible plastic material. A seal gasket 25 is located between the supporting part 3 and the case 7. The case 7 has ribs 27, 28 forming spacers in order to maintain a predetermined spacing between the case 7 and the supporting part 3. The spacers 27, 28 bear against the supporting part 3.

The case 7 is placed on the side opposite to the medallion 5 with respect to the supporting part 3. Thus, the supporting part 3 is located between the medallion 5 and the case 7.

In order to allow assembly of the supporting part 3, the medallion 5 and the case 7 to each other, a small column 29 is provided on the medallion 5, the first and second orifices 31 and 33, respectively, the case 7, and on the supporting part 3, as well as a rib 35 on the case 7.

The small column 29 is made from injection together with the zone 17 of the medallion. It protrudes with respect to the large face 21 of the zone 17, towards the case 7. It is engaged through the orifices 31 and 33. It extends out of the orifice 31, on the side of the case 7 opposite to the supporting part 3.

The small column 29 has a substantially tubular shape. It is firmly attached to the zone 17 of the medallion through a first end and is open at its second end.

The orifices 31 and 33 are positioned in coincidence with each other. They have respective sections which are slightly larger than those of the small column 29.

The rib 35 exactly follows the peripheral edge of the orifice 31. It protrudes with respect to the zone of the case 7 bearing the orifice 31, opposite to the supporting part 3. The rib 35 thus defines a tubular extension of the orifice 31.

The free end 37 of the small column 29 is located inside the tubular extension. The radial gap between the end portion of the small column 29 and the rib 35 is reduced and has the value, 0.5, 1 or 2 mm for example.

The spacer 28 of the case follows the peripheral edge of the orifice 31 and is placed in coincidence with this peripheral edge. It protrudes towards the supporting part 3, i.e. following a direction opposite to the rib 35. Said spacer 28 is thus a tubular extension of the orifice 31 in the opposite direction of the rib 35. The spacer 28 bears upon the peripheral edge of the orifice 33. Likewise, the spacer 24 of the medallion 5, borne by the large face 21, bears upon the peripheral edge of the orifice 33, on the side opposite to the spacer 28. Thus, the rib 35, the spacer 28 and the spacer 24 form tubular zones which extend each other.

The method for assembling the supporting part 3, the medallion 5 and the case 7 to each other will now be described in details.

The case 7, with the orifice 31 and the rib 35, is first attached temporarily to the supporting part 3. It is placed in a position, so that the orifice 31 coincides with the orifice 33. Then the medallion 5 is flattened against the supporting part 3 so that the small column 29 is engaged into the orifice 33, into the orifice 31 and into the rib 35 forming a tubular extension of the orifice 31. Then an ultrasonic welding tool 41 is brought closer to the rib 35, on the side of the case 7. The welding tool 41 first comes into contact with the free edge of the rib 35, which extends beyond the free end of the small column 29. Thus, the welding tool 41 first melts the free edge of the rib 35 and then melts together the small column 29 and the rib 35. The materials making up the rib 35 and the small column 29 melt, mix and partially flow out towards the inside of the first orifice 31 and then towards the inside of the second orifice 33.

These materials flow out, notably, into the annular space delimited by the small column 29 on the one hand and by the spacer 28 on the other hand, the edge of the orifice 33 and the spacer 24. These materials partially or completely fill up this annular space and form a ring 42 in the periphery of the orifice 31.

After cooling off, the materials making up the rib 35 and the small column 29 form a welded joint 43 firmly attaching the case 7, the supporting part 3 and the medallion 5 to each other.

More specifically, the molten materials from the rib 35 and the small column 29 form a joint directly welding the medallion 5 to the case 7. The supporting part 3 is mechanically blocked in a position between the medallion 5 and the case 7. It is caught between the medallion 5 and the case 7. Furthermore, the peripheral edge of the orifice 33 is possibly melted due to thermal conduction and participates in the welded joint 43.

Figure 2:
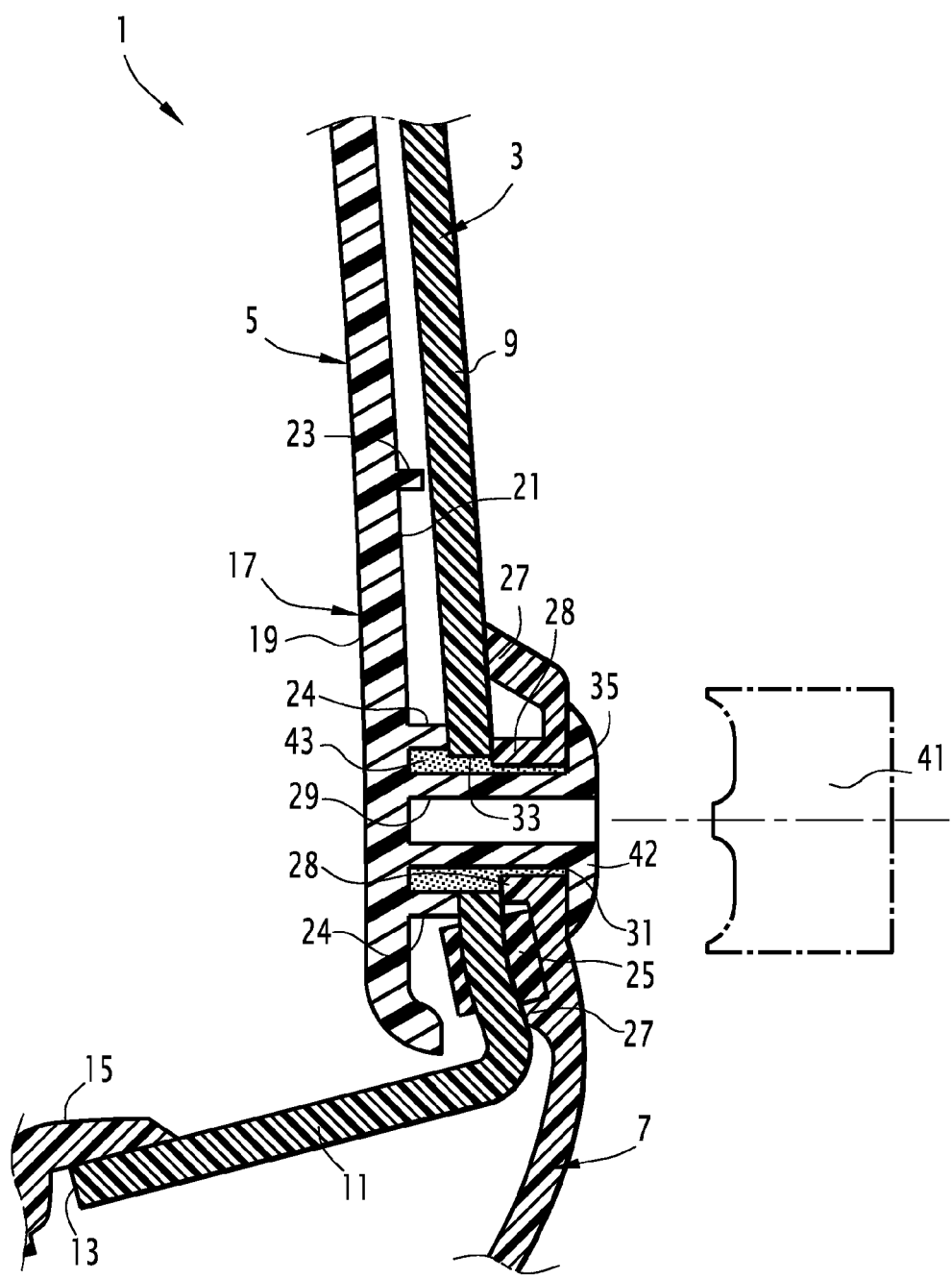
FIG. 2 shows a view similar to the one in FIG. 1, showing the condition of the three parts after producing the welded joint.

The amount of the material provided by the rib 35 and by the small column 29 is proportioned in such a way that the joint is sufficiently solid in order to observe the requirements specification of the designer. This amount of the material substantially corresponds to the amount of material which makes up the rib 35 and the amount of material making up the end of the small column 29 protruding out of the orifice 31. It should be noted that the welding tool 41, used for welding, as shown in FIGS. 1 and 2, the parts 3, 5 and 7 to each other, should also be adapted to weld the part 5 to the part 3, in the absence of the part 7. In this case, it is sufficient to melt the ends of the small column 29 in order to create a welded joint between the medallion 5 and the supporting part 3.

Figure 3:
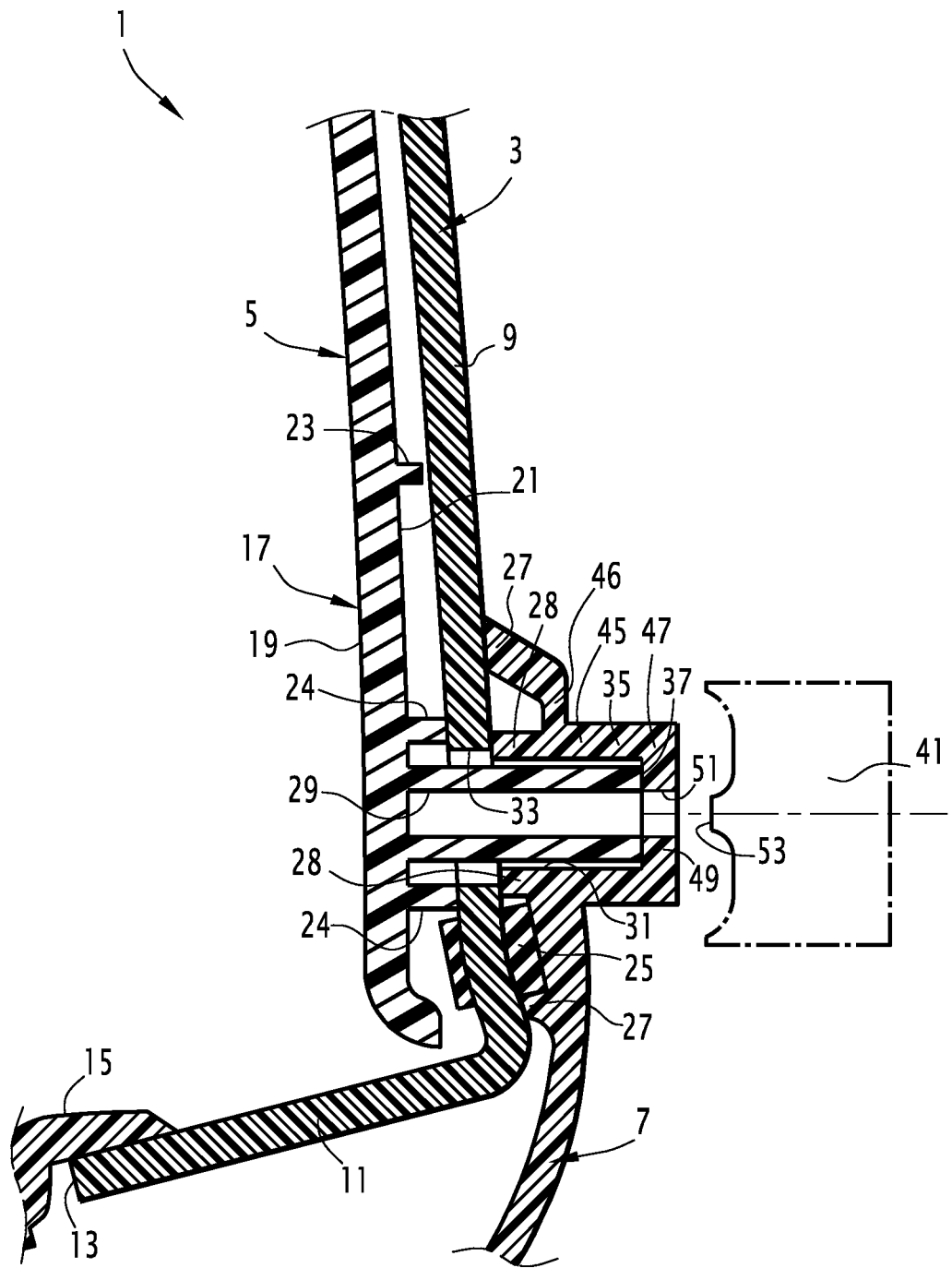
FIG. 3 shows a view similar to the one in FIG. 1 for an alternative embodiment of the invention.

In an alternative shown in FIG. 3, the second relief 35 presents a tubular shape with a first end 45 firmly attached to a zone 46 of the second part, in which the first orifice is formed, and a second end 47 partially closed by an end wall 49. The second end is opposite to the first one. The end wall 49 is substantially perpendicular to the central axis of the second relief 35. It has a central orifice 51, located on the central axis. The size of this orifice 51 is adapted to allow engagement of a central relief 53 of the welding tool 41. The end wall 49 provides part of the material of the welded joint 43, so that the first and the second reliefs may be shortened. The end wall 49 may also form an abutment against which the first relief will bear when the first part is attached to the second part in a temporary manner.

The invention claimed is:

1. A method for assembling at least two parts (5, 7) of an automobile vehicle to one another, with the method comprising the following steps:
   provide a first part (5) with a first protruding relief (29);
   provide a second part (7) with a first orifice (31);
   insert the first protruding relief (29) through the first orifice (31); and
   create a connection (43) of the first part (5) to the second part by melting the first protruding relief (29),
   the second part (7) has a second protruding relief (35) located in proximity to the first orifice (31), with the second protruding relief (35) being melted during the step for creating the connection (43) and providing material to the connection (43) so that the first protruding relief (29) and the second protruding relief (35), after cooling off, assemble together the first and second parts (5, 7) to each other, wherein, before the step for creating the connection (43) is performed, the second protruding relief (35) extends beyond a free end (37) of the first protruding relief (29) at a first determined distance (d).

2. The method according to claim 1, wherein the first and the second protruding reliefs (29, 35) are melted so as to create a weld between the respective materials of the first and second protruding reliefs (29, 35).

3. The method according to claim 1, wherein, before the step for creating the connection (43) is performed, the first protruding relief (29) protrudes with respect to the second part (7) at a second distance (L), with the first distance (d) comprising up to two thirds of the second distance (L).

4. The method according to claim 1, wherein, before the step for creating the connection (43) is performed, the first protruding relief (29) protrudes with respect to the second part (7) at a second distance (L), with the second distance (L) comprising between 0.8× an outer diameter of the first protruding relief (29) and 2.5× the outer diameter of the first protruding relief (29).

5. The method according to claim 1, wherein a third part (3) is positioned between the first and second parts (5, 7), with the third part (3) having a second orifice (33) through which the first protruding relief (29) is engaged, the connection (43) connecting the first, second and third parts (5, 7, 3) to each other.

6. The method according to claim 5, wherein at least one of the first, second and third parts (5, 7, 3) contains reliefs forming spacers (23, 24, 27, 28) to maintain predetermined gaps between the first, second and third parts (5, 7, 3).

7. The method according to claim 1, wherein the second protruding relief (35) is a rib extending over the entire periphery of the first orifice (31).

8. The method according to claim 1, wherein the second part (7) has a zone, in which the first orifice (31) is made, with the second protruding relief (35) protruding in a direction opposite to the first part (5) with respect to said zone.

9. The method according to claim 1, wherein the first part (5) has a visible face (19) intended to be visible by the passengers of the vehicle, with the first protruding relief (29) formed on a hidden face (21) opposite to the visible face (19).

10. The method according to claim 1, wherein the step for creating the connection (43) is performed by ultrasonic welding.

11. The method according to claim 1, wherein, before the step for creating the connection (43) is performed, the first protruding relief (29) extends in a longitudinal direction away from the first orifice (31) at a first length and the second protruding relief (35) extends in the same longitudinal direction away from the first orifice (31) at a second length greater than the first length.

12. The method according to claim 1, wherein, before the step for creating the connection (43) is performed, the first protruding relief (29) protrudes with respect to the second part (7) at a second distance (L), with the first distance (d) comprising up to half of the second distance (L).

* * * * *